April 17, 1956  A. J. CLAUSEN  2,742,304
PULL-TYPE SPREADER WITH MEANS FOR COUPLING TO A DUMP TRUCK
Filed Feb. 17, 1950
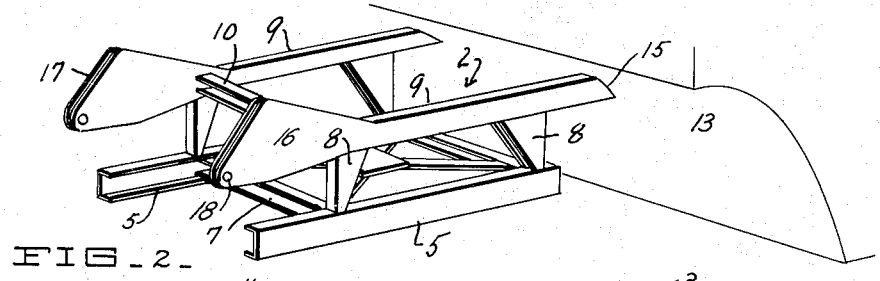
FIG_2_
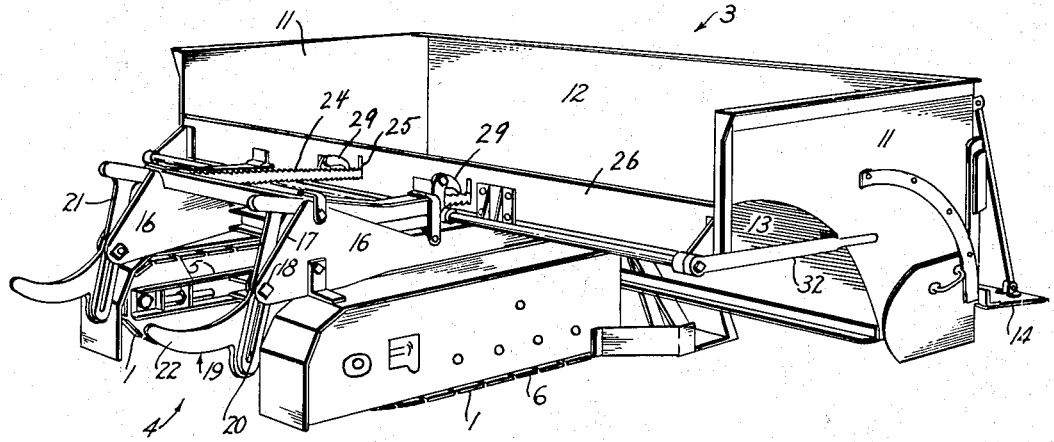
FIG_1_
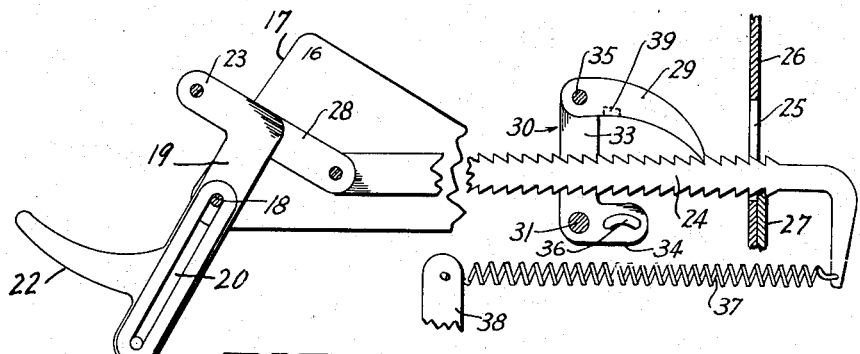
FIG_3_
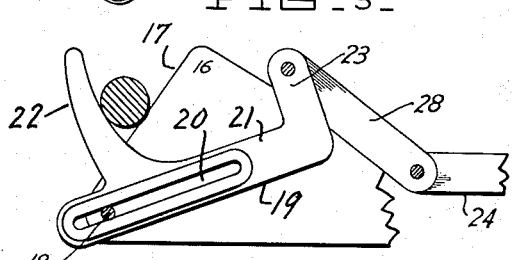
FIG_4_
INVENTOR
Andrew J. Clausen
BY
A. Schapp
ATTORNEY

United States Patent Office 2,742,304
Patented Apr. 17, 1956

2,742,304

PULL-TYPE SPREADER WITH MEANS FOR COUPLING TO A DUMP TRUCK

Andrew J. Clausen, Berkeley, Calif.

Application February 17, 1950, Serial No. 144,818

12 Claims. (Cl. 280—460)

The present invention relates to improvements in a pull-type spreader used in road construction for evenly spreading a load of road material, such as crushed rock, crushed gravel, asphaltic material and the like upon a finished roadbed.

Spreaders of this type usually comprise a hopper or spreader box adapted for attachment to a dump truck and for being pulled over the roadbed by the latter while a charge is dumped into the box from the truck, the box being arranged to deliver the charge upon the roadbed in an even layer.

One of the principal objects of my invention is to provide an attachment carried by the spreader whereby the latter may be conveniently secured to the rear axle of the dump truck regardless of the height of the axle above the roadbed and without requiring any chains or any special brackets or equipment carried by the dump truck.

A further object of the invention is to provide a convenient manipulating means for the attachment, allowing the rear axle of the dump truck to be backed up against a part of the attachment, to be firmly anchored thereto by operation of a lever arm, and to be quickly released by further operation of the lever arm.

A still further object of the invention is to provide a pair of track layers for supporting the entire spreader assembly, including the box and the attachment, the track layers serving to distribute the material evenly and level at all times regardless of grade conditions and to place the attachment in proper position with respect to the rear axle of the dump truck.

Further objects and advantages of my invention will appear as the specification proceeds, and the novel features of my invention will be fully defined in the claims attached hereto.

The preferred form of my invention is illustrated in the accompanying drawing, in which:

Figure 1 shows a perspective view of a pull-type spreader having the features of my invention incorporated therein, Figure 2, a perspective view showing the frame support for the attachment and the spreader box, Figure 3, a side view partly in section of the attachment with the parts in position before engagement with the rear axle of the dump truck, and Figure 4, a similar view showing a portion of the attachment in a position of engagement with said rear axle.

While I have shown only the preferred form of my invention, I wish to have it understood that various changes and modifications may be made within the scope of the claims attached hereto without departing from the spirit of the invention.

Referring to the drawing in detail, my spreader comprises in its principal features a pair of track layers 1, a frame 2 supported by the track layers, a spreader box 3 supported on the rear end of the frame, and a dump truck attachment 4 secured upon the front end of the frame.

The track layers 1 may be of any conventional form and comprise in their principal features a pair of elongated beams 5 having sprockets (not shown) mounted in the ends thereof and endless tracks 6 trained over the sprockets, with idlers (not shown) interposed between the beams and the track stretches in a conventional manner.

The two beams of the track layers are interconnected by cross-members 7, and the latter have uprights 8 rising therefrom which again carry a pair of parallel runners 9 extending throughout the length of the track layers and slightly beyond the same in the front as well as in the rear, the runners being interconnected by cross-members 10, in such a manner that the track layer beams, the uprights 8 and the runners 9 form a rigid and solid frame supported by the track layers.

The spreader box 3 may be of any conventional form and is here shown as comprising a pair of side members 11, a rear wall 12, a concaved front wall 13 and an open bottom through which material is fed upon the roadbed, suitable control means being provided as at 14 to smoothen out the layer of material on the roadbed. The concave front wall is secured upon the rear end of the runners 9 as at 15.

At their front ends the runners terminate in shoes 16 arranged in registering relation, each runner having two spaced shoes, and all the shoes having parallel and registering front edges or faces 17, which are inclined and disposed at an elevation corresponding to that of the conventional rear axle of a dump truck, the said front edges being sufficiently long from top to bottom to compensate for any differences in elevation in the rear axles of different dump trucks such as might be caused by differences in design or in tire pressure. The shoes project forwardly sufficiently far to allow the rear axle of a dump truck to be backed up against the same, and the entire structure of the track layers, the attachment and the box is such as to allow the dump truck to discharge into the box by a conventional dumping operation when the rear axle is backed up against the shoes.

Each pair of shoes carries, near the bottom end, a pin 18 which has a hook 19 mounted thereon with freedom of swinging and sliding motions, the hook being formed with an elongated, rectilinear slot 20 for this purpose. Each hook comprises a straight shank 21 having the slot 20 in the lower end thereof, a claw 22 projecting forwardly from the lower end of the shank, and a short arm 23 projecting forwardly from the upper end of the arm. Normally the hooks, due to gravity and the presence of control members to be described, assume the position shown in Figures 1 and 3, with upper end walls of the slots resting on the pins 18, and the claw members 22 disposed somewhat below the shoes 16 so as not to interfere with the backing up of the rear axle of the dump truck against the shoes.

Each of the hooks is operated for swinging and sliding movement by means of a rack rod 24, the rear end of which projects through a slot 25 in a plate 26 fixed with respect to the spreader box. At the lower end of the slot I provide a keeper 27 adapted to cooperate with the lower set of teeth on the rack rod for holding the latter against forward movement.

The forward end of each rack rod is connected to the arm 23 of its respective hook by means of suitable linkage indicated at 28, and a pawl 29 is used on connection with each rack rod for pushing the same backward. The two pawls are pivoted in the upper ends of a pair of bell crank levers 30 mounted upon a transverse shaft 31 which extends across the width of the spreader box and is actuated manually by means of a lever arm 32 extending rearwardly along one of the sides of the box.

Each bell crank 30 comprises an arm 33 extending vertically from the shaft 31 when the arm 32 occupies a substantially horizontal position, and a second arm 34 extending horizontally in parallel relation to the rack rod at the same time. The vertical arm has the pawl 29 pivoted thereto as at 35, the pawl engaging with the upper set of teeth in the rack rod and being made to push the latter backward when the arm 32 is depressed. The rack rod may thus be retracted to any desired position by successive operations of the handle 32, the pawl pushing the rod backward, and the keeper 27 holding the rack rod while the pawl takes a new bite.

For releasing the rack rod I use the horizontal arm 34 of the bell crank 30 which is formed with a tongue 36 arranged underneath the rack rod, the tongue having a curved upper face so as to allow the lower teeth of the rack rod to slide thereover. In order to effect release the operator lifts the arm 32 which causes the tongue 36 to lift the rack rod so as to free it from the keeper 27, and allows the rod to plunger forward under the influence of a spring 37 connecting the rear end of the rod with a fixed frame member 38.

To prevent the pawl 29 from interfering with the forward movement of the rack rod I provide a small stop 39 which cooperates with the bell crank lever arm 33 in lifting the pawl sufficiently to clear the upper teeth of the rod when the tongue 36 lifts the latter.

As the two rack rods are retracted by operation of the arm 32, after the rear axle of the dump truck has been backed up against the shoes 16, the hooks 19 are first tilted on the pins 18 so as to cause the claw members 22 to rise in front of the rear axle. On continuation of the retracting movement the hooks reach a substantially horizontal position and are then pulled backward with the rack rods until the claws contact the rear axle and firmly press the same against the shoes. The axle is now firmly held in a pair of substantially V-shaped crotches formed by the shoes and the claw members.

This action is brought about by a downward pumping action on the lever arm 32. For releasing the engagement, the operator merely lifts the arm 32, which causes the tongues 36 to release the rack rods with the result that the latter plunge forward under the influence of the springs 37 and the weight of the hooks.

In operation, the dump truck merely backs up against the spreader until the rear axle contacts the shoes. The operator then pumps the arm 32 in downward impulses from the horizontal position, thereby first swinging the claws upward forwardly of the rear axle and then pulling the claws backward for tightening the engagement. For releasing the engagement, the operator lifts the arm 32 which causes the rack rods to plunge forward and the hooks to return to their initial positions.

I claim:

1. In a pull-type spreader of the character described, a frame, a rolling support for the same, the frame having a pair of forwardly presented shoes adapted to have the rear axle of a dump truck backed up thereagainst, a pair of pivots in the lower ends of the shoe, and a pair of hooks swingable on the pivots and operable for swinging movement to a position forward of the axle, the hooks having elongated slots with walls adapted to ride on the pins whereby the hooks may be retracted after they have reached the latter position for tightening the hooks upon the rear axle.

2. In a pull-type spreader of the character described, a frame, a rolling support for the same, the frame having a pair of forwardly presented shoes adapted to have the rear axle of a dump truck backed up thereagainst, a pair of pivots in the lower ends of the shoes, and a pair of hooks swingable on the pivots and operable for swinging movement to a position forward of the axle, the hooks having elongated slots with walls adapted to ride on the pins whereby the hooks may be retracted after they have reached the latter position for tightening the hooks upon the rear axle, and actuating means for the hooks operable for carrying out the swinging movement and the retracting movement in related order.

3. In a pull-type spreader of the character described, a frame, a rolling support for the same, the frame having a pair of forwardly presented shoes adapted to have the rear axle of a dump truck backed up thereagainst, a pair of hooks pivoted in the lower ends of the shoes and operable for swinging movement to a position forward of the rear axle, and actuating means for the hooks comprising, a keeper supported with respect to the frame, a rack bar having a link connection with the hooks and having toothed lower and upper edges, with the lower edge engaging over the keeper for holding the rack bar against reverse movement, a shaft supported transversely of the frame, and means mounted on the shaft for advancing the rack rod over the keeper when the shaft is turned in one direction.

4. In a pull-type spreader of the character described, a frame, a rolling support for the same, the frame having a pair of forwardly presented shoes adapted to have the rear axle of a dump truck backed up thereagainst, a pair of hooks pivoted in the lower ends of the shoes and operable for swinging movement to a position forward of the rear axle, and actuating means for the hooks comprising, a keeper supported with respect to the frame, a rack bar having a link connection with the hooks and having toothed lower and upper edges, with the lower edge engaging over the keeper for holding the rack bar against reverse movement, a shaft supported transversely of the frame, and means mounted on the shaft for advancing the rack rod over the keeper when the shaft is turned in one direction, including means for releasing the rack bar from the keeper when the shaft is turned in the opposite direction.

5. In a pull-type spreader of the character described, a frame, a rolling support for the same, the frame having a pair of forwardly presented shoes adapted to have the rear axle of a dump truck backed up thereagainst, a pair of hooks pivoted in the lower ends of the shoes and operable for swinging movement to a position forward of the rear axle, and actuating means for the hooks comprising, a keeper supported with respect to the frame, a rack bar having a link connection with the hooks and having toothed lower and upper edges, with the lower edge engaging over the keeper for holding the rack bar against reverse movement, a shaft supported transversely of the frame, and means mounted on the shaft for advancing the rack rod over the keeper when the shaft is turned in one direction, including means for releasing the rack bar from the keeper and for rendering the advancing means inactive when the shaft is turned in the opposite direction.

6. In a pull-type spreader of the character described, a frame, a rolling support for the same, the frame having a pair of forwardly presented shoes adapted to have the rear axle of a dump truck backed up thereagainst, a pair of hooks pivoted in the lower ends of the shoes and operable for swinging movement to a position forward of the rear axle, and actuating means for the hooks comprising, a keeper supported with respect to the frame, a rack bar having a link connection with the hooks and having toothed lower and upper edges, with the lower edge engaging over the keeper for holding the rack bar against reverse movement, a shaft supported transversely of the frame, a bell crank lever mounted on the shaft having one arm arranged normally transversely to the rod and a second arm normally paralleling the lower edge of the rod, a pawl supported in the first arm and cooperable with the upper edge of the rod in advancing the rod when the shaft is turned in one direction, and a tongue on the second arm and engageable with the lower edge of the rod for freeing the latter from the keeper when the shaft is turned in the opposite direction.

7. In a pull-type spreader of the character described, a frame, a rolling support for the same, the frame having a pair of forwardly presented shoes adapted to have the rear axle of a dump truck backed up thereagainst, a pair of hooks pivoted in the lower ends of the shoes and operable for swinging movement to a position forward of the rear axle, and actuating means for the hooks comprising, a keeper supported with respect to the frame, a rack bar having a link connection with the hooks and having toothed lower and upper edges, with the lower edge engaging over the keeper for holding the rack bar against reverse movement, a shaft supported transversely of the frame, a bell crank lever mounted on the shaft having one arm arranged normally transversely to the rod and a second arm normally paralleling the lower edge of the rod, a pawl supported in the first arm and cooperable with the upper edge of the rod in advancing the rod when the shaft is turned in one direction, and a tongue on the second arm and engageable with the lower edge of the rod for freeing the latter from the keeper when the shaft is turned in the opposite direction, the first arm and the pawl having cooperating means for rendering the pawl inactive when the tongue frees the rod from the keeper.

8. In road machinery of the character described, a frame having road equipment mounted thereon, a wheel support for the frame, and means carried by the frame for directly coupling the front end thereof to the rear axle of a dump truck, the said means comprising a pair of shoes fixed on the frame and having forwardly presented upright faces forming abutments at the height of the axle for arresting the axle when backed up against the abutments and cooperative means pivotally and slidably carried on the frame engageable over the front of the axle for holding the latter to the abutments throughout the length of the abutments, the abutments being vertically extended to register with axles of different heights within the normal range of dump truck axle heights.

9. In road machinery of the character described, a frame having road equipment mounted thereon, a wheel support for the frame and means carried by the frame for directly coupling the front end thereof to the rear axle of a dump truck, the said means comprising a pair of shoes fixed on the frame and having forwardly presented upright faces forming abutments at the height of the axle for arresting the axle when backed up against the abutments, fixed horizontal pins adjacent said faces and hooks pivotally and slidably carried on said pins and operable for engagement over the front face of the backed-up axle for interlocking engagement therewith, the abutments being vertically extended to register with the axles of different heights within the normal range of dump truck axle heights.

10. In road machinery of the character described, a frame having road equipment mounted thereon, a wheel support for the frame, and means carried by the frame for directly coupling the front end thereof to the rear axle of a dump truck, the said means comprising a pair of shoes fixed on the frame and having forwardly presented upright faces forming abutments at the height of the axle for arresting the axle when backed up against the abutments, fixed horizontal pins adjacent said faces, and hooks pivoted on said pins and operable for engagement over the front face of the backed-up axle for interlocking engagement therewith, the abutments having rearwardly inclined, elongated and substantially straight contact faces and the hooks having forwardly inclined, elongated and substantially straight contact faces when engaged over the axle to form on open crotch with the abutment for receiving the axle, with the height of the crotch varying with the depth of the engagement to accommodate axles of different heights.

11. In road machinery of the character described, a frame having road equipment mounted thereon, a wheel support for the frame, and means carried by the frame for directly coupling the front end thereof to the rear axle of a dump truck, the said means comprising a pair of shoes fixed on the frame and having forwardly presented upright faces forming abutments at the height of the axle for arresting the axle when backed up against the abutments, fixed horizontal pins adjacent said faces and hooks pivoted on said pins and operable over the front face of the backed-up axle for interlocking engagement therewith, the hooks being slotted for riding on the pins to tighten the hooks upon the axle after engagement over the front faces thereof.

12. In road machinery of the character described, a frame having road equipment mounted thereon, a wheel support for the frame, and means carried by the frame for directly coupling the front end thereof to the rear axle of a dump truck, said means including an abutment surface that is inclined to the horizontal and of such length as to register with axles of different heights above the ground within the normal range of dump truck axle heights without vertical adjustment, and cooperative means shiftable by pivotal and sliding movement relative to said abutment surface for engaging forward and rear portions of the dump truck axle over a relatively wide range of axle heights for interlocking the spreader with the dump truck.

References Cited in the file of this patent

UNITED STATES PATENTS

| | | |
|---|---|---|
| 1,435,064 | Holmes | Nov. 7, 1922 |
| 1,535,397 | Buffington | Apr. 28, 1925 |
| 2,050,518 | Baumgardner | Aug. 11, 1939 |
| 2,397,558 | Mennen | Apr. 2, 1946 |
| 2,403,820 | Miller | July 9, 1946 |
| 2,456,359 | Andrews | Dec. 14, 1948 |
| 2,482,741 | Carmichael | Sept. 27, 1949 |